United States Patent [19]

Sekelsky

[11] 3,916,521

[45] Nov. 4, 1975

[54] HEDGE CLIPPING CATCHER TRAY

[76] Inventor: George Sekelsky, 70 Sekelsky Drive, Stratford, Conn. 06497

[22] Filed: Sept. 30, 1974

[21] Appl. No.: 510,178

[52] U.S. Cl. ................................................. 30/132
[51] Int. Cl.² ........................................ B26B 19/48
[58] Field of Search ......... 30/131, 132; 56/194, 144

[56] References Cited
UNITED STATES PATENTS

| 2,281,189 | 4/1942 | Wright | 30/132 |
| 2,510,311 | 6/1950 | Greene | 30/132 |
| 3,073,025 | 1/1963 | Yatsko | 30/132 |

Primary Examiner—Al Lawrence Smith
Assistant Examiner—J. C. Peters
Attorney, Agent, or Firm—Mattern, Ware and Davis

[57] ABSTRACT

An attachment for a typical hedge trimming device that catches the clippings is described. The catcher tray, which has a provision for catching clippings of a variety of sizes, may be positioned at a number of angles to the cutting plane to facilitate cutting in a number of directions.

8 Claims, 11 Drawing Figures

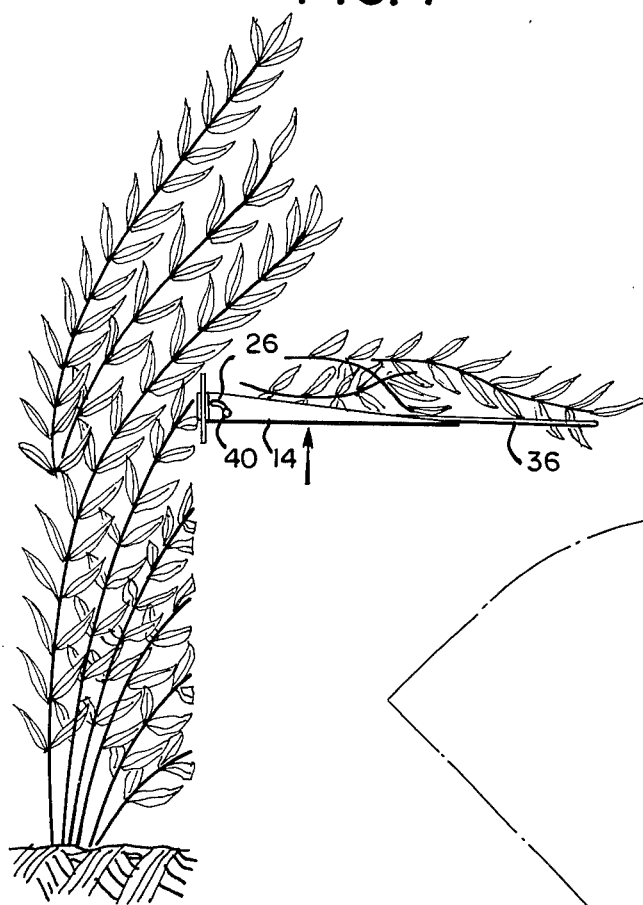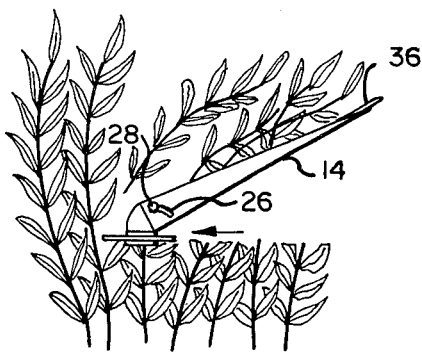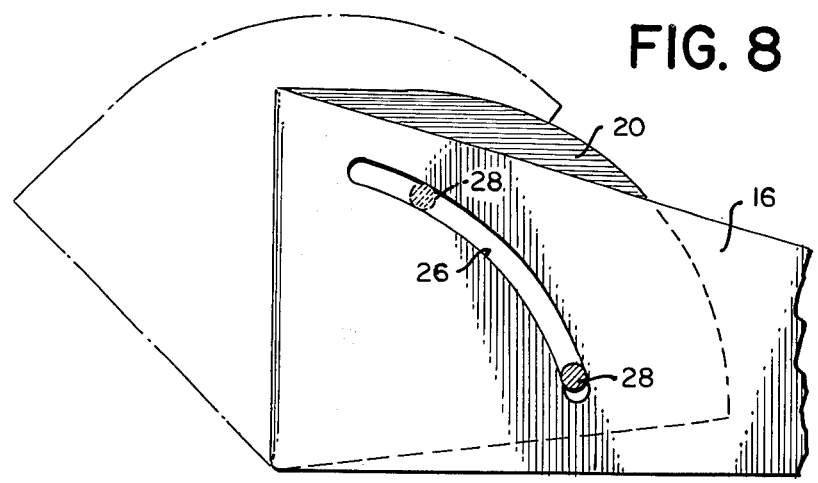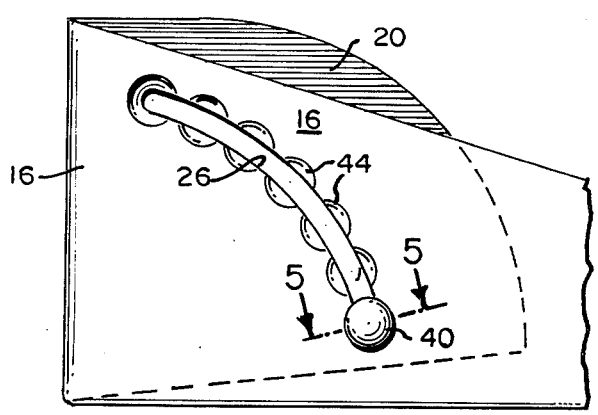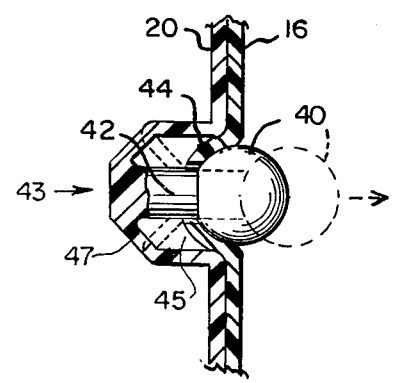

HEDGE CLIPPING CATCHER TRAY

BACKGROUND OF THE INVENTION

This invention relates to a new and useful attachment for a hand-held device used to trim hedges, shrubs and the like. More particularly, this invention discloses a novel tray construction that catches the clippings produced by a hedge trimming device.

It is well known that picking-up of cut twigs, etc., after they have been cut by a trimming device can be very tedious and time consuming. In addition, where the clippings are very small and/or thorned, it may be very difficult to retrieve them for proper disposal after cutting. Also, clippings may fall into an inaccessible area such as the interior of the bush or on the opposite side of some uncrossable boundary line. Thus, a device which could immediately catch clippings and eliminate subsequent pick-up would be very useful.

The prior art has disclosed a number of devices for catching grass and twig clippings, in cooperation with the cutting device, so that the need for future clean-up is unnecessary. See U.S. Pat. Nos.: Frauenheim 3,212,186, Appleton 2,460,616, Bray 2,946,123, Minunno 3,561,200, Davis 2,277,080, and Monroe 795,151 for examples of these devices. However, none of these devices has provided the combination of conveniences that I have incorporated into my clipping catcher tray. These prior devices have been bulky and heavy in addition to being inflexible with respect to the size of the clipping cut and as to provide for optional catcher tray positions when cutting at a number of angles.

It is thus the main object of this invention to provide an attachment for catching the clippings of a hand-held type clipper, wherein the catcher tray has a provision for retaining extra long clippings and is positively adjustable over a wide range of angles, to the cutting plane, for the most efficient catching of the clippings when the clipper is operated in a variety of directions.

Further features, and other objects and advantages of this invention, will become apparent from a study of the following more detailed description with reference to the drawings.

SUMMARY OF THE INVENTION

According to one embodiment of the present invention, a catcher tray is provided that attaches to the cutting bar of a typical hadge or shrub trimmer by means of a hinged bottom plate. Further, the catcher tray has a moveable outrigger bar which can be adjusted to catch and support a variety of clipping sizes. In addition, the catcher tray is hinged at its base near the cutting bar and has a positive locking device so that the tray may be positioned in a range of angles to the cutting angle so that clippings are efficiently caught at different clipper attack angles.

According to an alternate embodiment of the present invention, a catcher tray is of a unitary shape having a specific width equal to the width of the clipper cutting bar. An adjustable outrigger bar is positioned on this catcher tray and allows a variety of clipping sizes to be caught by this alternate embodiment. This particular alternate embodiment is extremely inexpensive to manufacture.

THE DRAWINGS

Further features of this invention will become more apparent with reference to the following drawings:

FIG. 5 is a cross-sectional side view taken along line 5—5 of FIG. 6 of an optional mechanism for adjusting the position of the catcher tray assembly.

FIG. 6 is a partial side view of a ball-detent adjusting mechanism for the catcher tray as detailed in FIG. 5.

FIG. 7 is an illustration of the catcher tray position, normally 90° to the cutting plane, when cutting the side or edge of a shrub as shown. The ball-detent position shown in FIG. 6 is in the position for cutting as shown in FIG. 7.

FIG. 8 is a partial side view of the catcher tray illustrating the range of angles to which the catcher tray may be adjusted. In this figure, a wing-nut and bolt assembly is used to positively position the tray.

FIG. 9 is an illustration of the catcher tray position when trimming the top of a shrub as shown. The position of the locking device, the wing-nut and bolt, for this catcher tray position is shown in FIG. 8.

DETAILED DESCRIPTION

Figure 2:
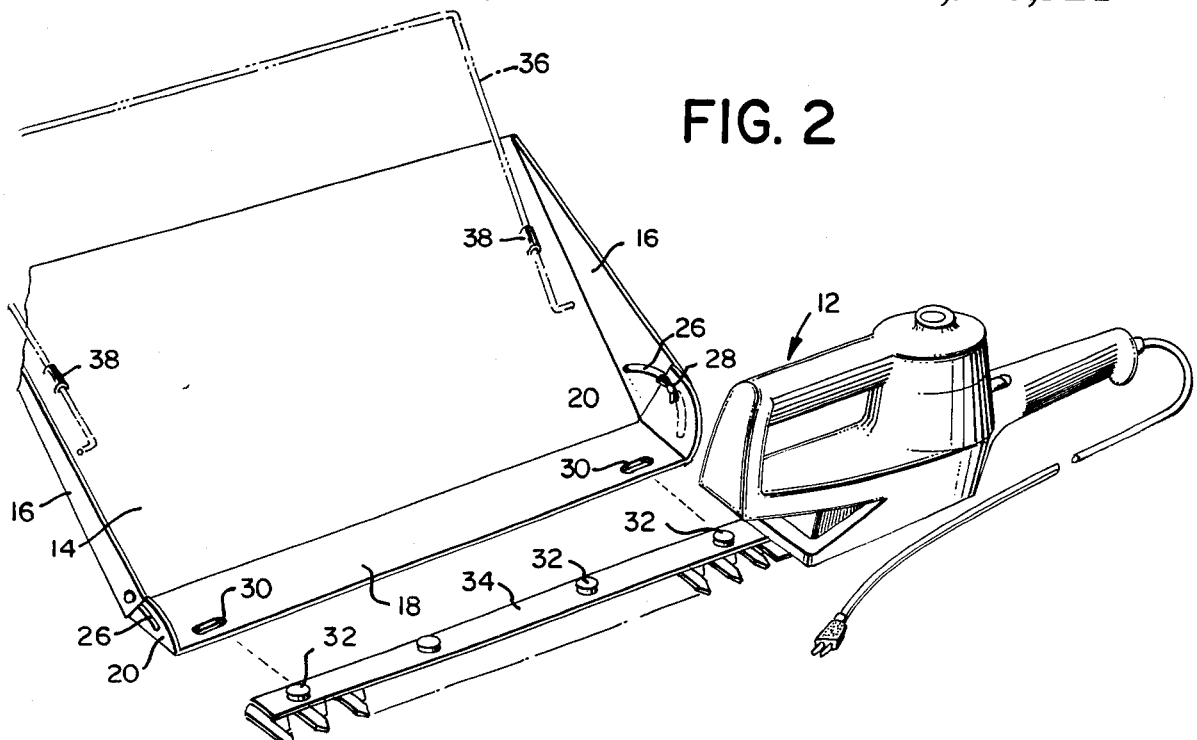
FIG. 2 is a perspective view of the catcher tray assembly of FIG. 1 showing how the catcher tray assembly cooperates with a typical hedge trimmer device.
Figure 1:
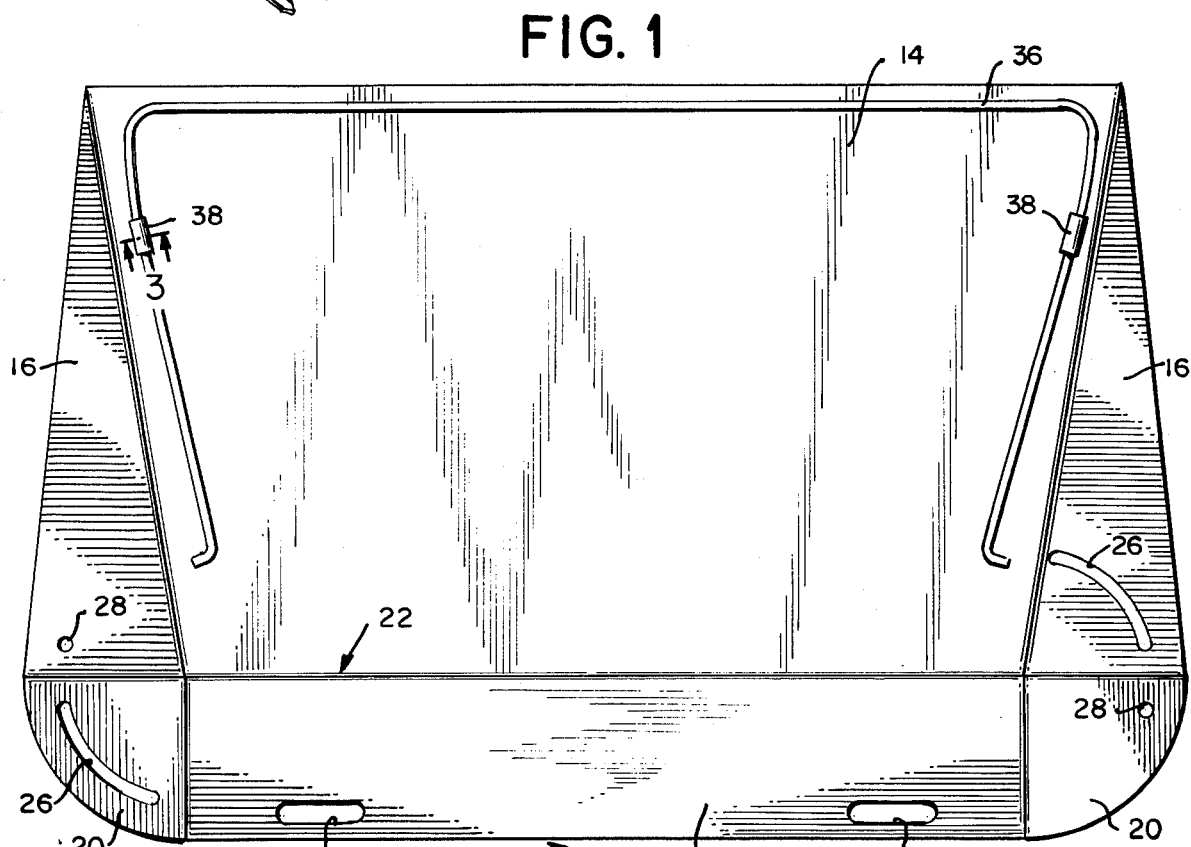
FIG. 1 is a plan view of the catcher tray assembly, according to this invention, with the sides and moveable bottom in the same plane as the main body.

As best seen in FIGS. 1 and 2, the catcher tray assembly 10 comprises a flat main body portion 14 at each side of which is formed an angled side 16. The bottom portion of the catcher tray 10 is formed by a hinged bottom plate 18 at each side of which is formed an angled side 20.

Figure 4:
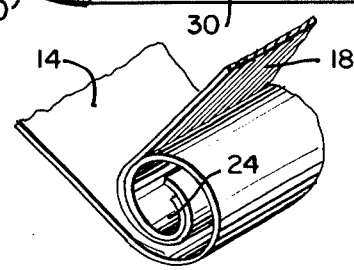
FIG. 4 is a partial perspective view of an alternative hinging device for the catcher tray assembly.

When the catcher tray is formed of a flexible material such as polypropylene with a high fatigue stress limit, the bottom plate 18 is flexibly attached to the main body portion 14 of the catcher tray assembly by means of a flexible unitary "living" hinge 22 extending across and joining the entire length of the bottom plate with the main body portion. FIG. 4 shows an alternative hinging method for joining the bottom plate and main body when these parts are formed of less felxible materials such as sheet metal or polyethylene. A rolled hinge 24 is formed by interfitting convolutely or spiral-rolled edges on the ends of both the bottom plate and main body. Further, the main body 14 and bottom plate 18 hinged assembly is provided with means for adjustment over a range of positions or angles between the two.

In FIGS. 1 and 2, a wing nut-bolt lock slide arrangement for adjustment of the desired angle, between the main body of the tray assembly and the hinged bottom plate, is shown. In particular, one of the catcher tray sides 16 and the opposite angled side 20 are provided with a curved slot 26. On the other tray side and bottom plate side are located wing nut-bolt assemblies 28 which engage the adjacent curved slots 26, thus providing for positive holding of the main body 14 and bottom plate 18 relative to one another at a variety of angles (see FIG. 8).

As best seen in FIGS. 7 and 9, the catcher tray main body portion 14 may be positioned at various attack angles with respect to the plane of cutting bar 34 of a standard hedge or shurb trimming device, in order to catch clippings as they are produced when cutting a side of a hedge (FIG. 7) or a top of a hedge (FIG. 9). The full range of angles to which the catcher tray may be adjusted is best seen in FIG. 8.

An alternative to the wing nut-bolt angle adjustment provision is best seen in FIGS. 5 and 6. Here, a ball-detent arrangement is used to positively position the catcher tray in relation to the cutting plane of the hedge or shurb trimming device. In particular, a transversely movable ball knob 40 is located at the end of a shaft 42 which in turn terminates with a U-shaped socket member 43. The socket member is preferably constructed of polypropylene or of other highly resilient material so that the shaft 42 along with knob 40 is resiliently pulled toward socket 45 generated by the U-shaped socket member.

The socket member is integrally formed in a portion of one of the angle sides 20 of the hinged bottom plate 18 so that shaft 42 is positionable within the corresponding curved slot 26 of catcher tray side 16. This corresponding curved slot incorporates a plurality of socket depressions 44 in which knob 40 may lockedly engage. Thus, as best seen in FIG. 6, any one of a number of positions may be selected to position the catcher tray side and thus the main body portion to the bottom plate of the catcher tray assembly. Since the socket member is constructed of a highly resilient material, the knob 40 may be easily pulled outward away from socket depression 44. When so pulled outward, the angle side wall 47 of the U-shaped member flexes outwardly due to the "living hinge" construction of member 43 (see FIG. 5 in phantom). Once knob 40 is placed over a desired socket depression, release of the knob will allow the resilient U-shaped member to pull the knob toward the socket depression thereby maintaining the main body portion of the catcher tray assembly at the desired angle with respect to the bottom plate 18.

As best seen in FIGS. 1 and 2, the hinged bottom plate 18 is provided with a pair of straight slots 30 which allow the catcher tray assembly to be mounted by means of a pair of bolts 32 on the cutting bar 34 of a standard hedge or shrub trimming device 12. Since bolts may not be equally spaced for all hedge or trimming devices 12, the slots 30 have sufficient transverse length to accommodate for such variations. Only two bolts are needed to secure the catcher tray assembly to a hedge or shrub trimming device. In addition, the assembly may be easily detached from the device.

Figure 3:
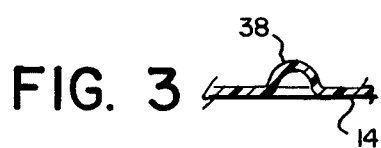
FIG. 3 is a cross-sectional front elevation view taken along line 3—3 of FIG. 2 of the upset slit sleeve portion of the catcher tray assembly of FIG. 1, for positioning the outrigger bar.

As best seen in FIGS. 1, 2 and 3, the catcher tray is provided with an extendable outrigger bar 36 which helps support the larger clippings as they fall into the tray. The outrigger bar is of a generally U-shaped configuration and is secured to the main body 14 of the catcher tray by a pair of arcuately—cross-sectioned sleeved enclosures 38; the construction of which is shown in detail in FIG. 3. As seen in FIG. 3, the sleeves are preferably formed from the main body portion 14 of the catcher tray. Thus, if long clippings such as those shown in FIG. 7, are to be retrieved, the outrigger bar 36 is fully extended. For retrieving short clippings such as those shown in FIG. 9, the outrigger bar need only be slightly extended. Since the outrigger bar is frictionally secured to sleeved enclosures 38, the bar may be positioned at any place from fully retracted to fully extended.

The entire tray construction may be formed by stamping and forming sheet metal. The hinge 22 may be of any conventional hinge construction, and the interfitting convolutely rolled edges of FIG. 4 may be preferably formed by the rolled sheet metal at the adjoining edges of the main body portion of the catcher tray and the bottom plate. When both the tray and bottom plate are formed integrally from a unitary stiff polypropylene plastic sheet, they may be joined together by a scored resiliently flexible hinge portion of the same sheet. Such a "living hinge" has the desireable quality of being capable of pivoting without fatiguing as is common with many other types of plastic materials.

Figure 10:
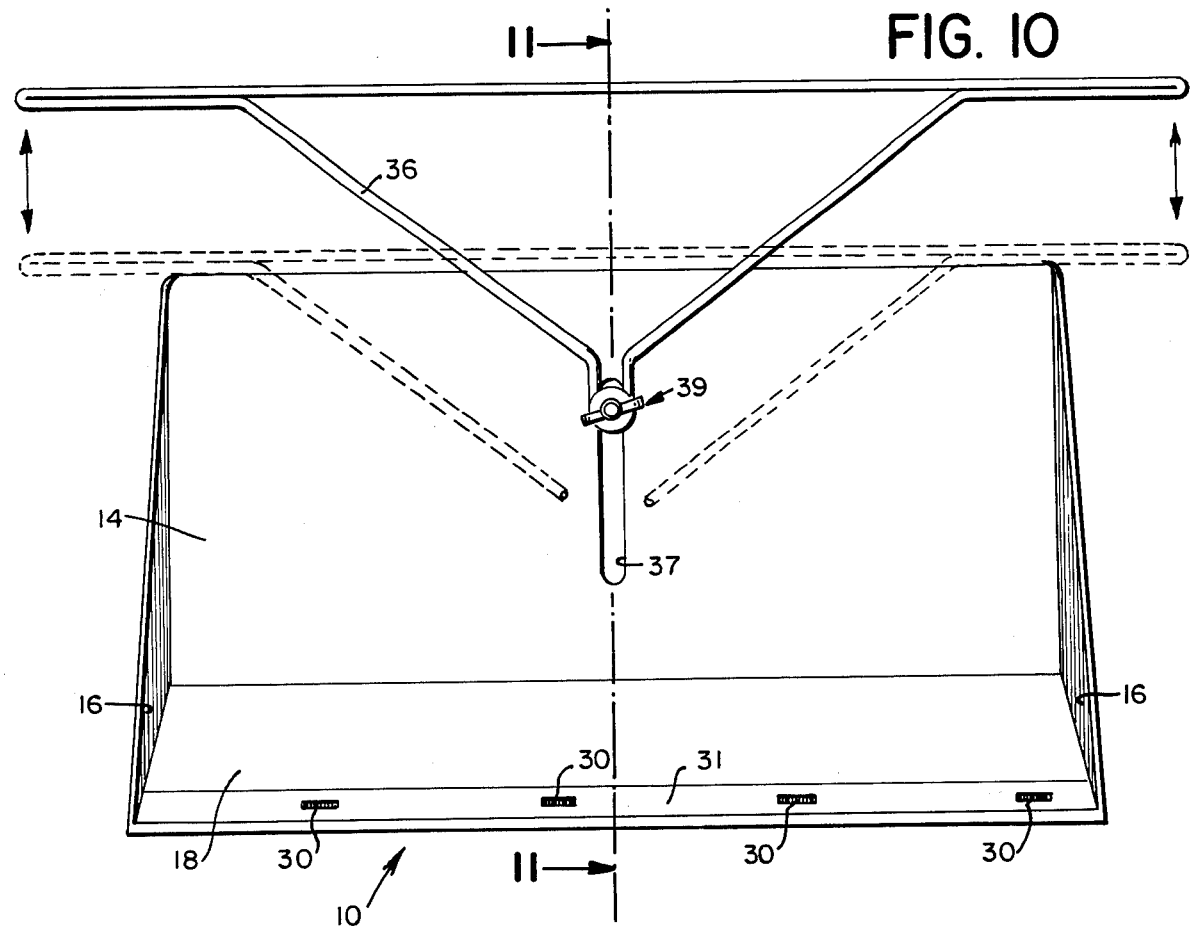
FIG. 10 is a top plan view of an alternate version of the present invention showing a unitary catcher tray assembly with a positionable outrigger bar.
Figure 11:
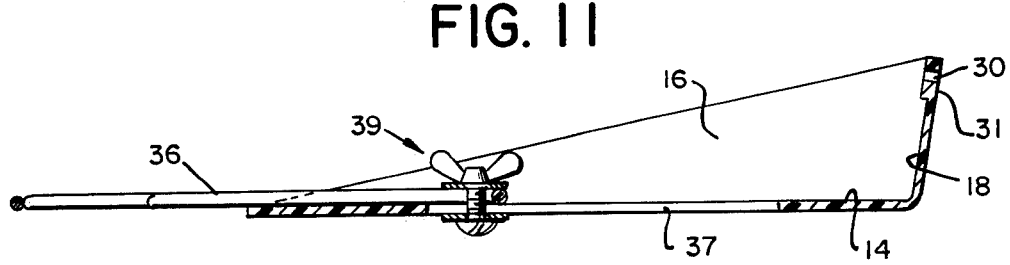
FIG. 11 is a cross-sectional side view taken along line 11—11 of FIG. 10 of the alternate catcher tray assembly.

As may best be seen in FIGS. 10 and 11, an alternate embodiment of the catcher tray assembly 10 comprises a unitary main body portion 14 that is integrally formed with catcher tray sides 16 and bottom plate 18. This particular catcher tray assembly is preferably constructed from a stiff polypropylene plastic. The bottom plate 18 has a length substantially equal to the length of the cutting bar of standard hedge trimming devices. The bottom plate also incorporates slots 30 that allow mounting the catcher tray assembly to the cutting bar of the hedge trimming device. The bottom plate also incorporates a raised elongated rectangular portion 31 to provide structural rigidity to the plate at the region where it mounts to the hedge trimming device.

Furthermore, this alternate embodiment of the catcher tray assembly incorporates an outrigger bar that may preferably be formed from a standard coat hanger. This outrigger bar is positionable within a slot 37 in the main body portion of the catcher tray by means of a wing nut-machine screw-washer assembly 39. Due to the unitary nature of this alternate catcher tray assembly and the use of standard coat hangers to form the outrigger bar, this alternate embodiment of the present invention is extremely inexpensive to manufacture.

Thus, what has been described is a novel catcher tray assembly for standard hedge and shrub trimming devices. The catcher tray assembly is easily mountable and demountable to such a trimming device, and incorporates a deployable and retractable outrigger bar for retaining clippings that are substantially longer than the main body tray portion of the invention. Furthermore, the main body portion of the invention is adjustable with respect to the cutting plane of the trimming device so as to facilitate catching of clippings regardless of the cutting angle of the trimming device. Such adjustments of the main body portion of the invention is accomplished via either a wing nut, slot assembly having an infinite number of positions or a ball-detent slot assembly having a plurality of lockable positions. Either embodiment of the angle adjustment mechanism is easily re-adjusted for the particular trimming operation undertaken.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed is:

1. A clipping catcher attachment for a hedge trimming device operable to trim the ends of shrubbery, twigs and branches along a cutting plane, having a stationary cutting bar and a reciprocating shear blade, comprising:
   A. an adjustable clipping catcher tray incorporating a main body portion with cooperating sides;
   B. a bottom hingedly attached to said main body portion and secured to a cutting bar of said trimming device;
   C. means detachably connecting said tray with said bottom and adjusting the angle of said clipping catcher tray relative to the cutting plane of said trimming device over a plurality of angles comprising a range of adjusted positions; and
   D. an extensible outrigger bar having adjustment leg means grippingly engaged in elongated anchoring sleeve aperture means extending generally perpendicular to the cutting bar formed in the main body portion of the clipping catcher tray, whereby the outrigger bar may be extended away from or retracted toward said cutting bar.

2. A clipping catcher attachment as defined in claim 1, wherein the hinge joining said bottom plate and main body portion comprises a pair of overlyingly convolutely rolled edges on both the bottom plate and the main body portion of the clipping catcher tray.

3. A clipping catcher attachment for a hedge trimming device operable to trim the ends of shrubbery, twigs and branches along a cutting plane, having a stationary cutting bar and a reciprocating shear blade, comprising:
   A. an adjustable clipping catcher tray incorporating a main body portion with cooperating sides;
   B. a bottom hingedly attached to said main body portion and secured to a cutting bar of said trimming device;
   C. means detachably connecting said tray with said bottom and adjusting the angle of said clipping catcher tray relative to the cutting plane of said trimming device over a plurality of angles comprising a range of adjusted positions; and
   D. an extensible outrigger bar shaped as a two-legged, squared-off, U-shaped bow having adjustment legs slidably and grippingly engaged in elongated anchoring sleeve portions of the catcher tray extending generally perpendicular to the cutting bar for support and adjustment of the outrigger bar relative to the catcher tray.

4. A clipping catcher attachment for a hedge trimming device operable to trim the ends of shrubbery, twigs and branches along a cutting plane, having a stationary cutting bar and a reciprocating shear blade, comprising:
   A. an adjustable clipping catcher tray incorporating a main body portion with cooperating sides;
   B. a bottom hingedly attached to said main body portion and secured to a cutting bar of said trimming device; and
   C. means detachably connecting said tray with said bottom and adjusting the angle of said clipping catcher tray relative to the cutting plane of said trimming device over a plurality of angles comprising a range of adjusted positions;
   wherein said bottom portion and said main body portion are formed integrally from a unitary stiff plastic sheet and joined together by a scored resiliently flexible hinge portion of said sheet.

5. A clipping catcher attachment for a hedge trimming device operable to trim the ends of shrubbery, twigs and branches along a cutting plane, having a stationary cutting bar and a reciprocating shear blade, comprising:
   A. an adjustable clipping catcher tray incorporating a main body portion with cooperating sides;
   B. a bottom hingedly attached to said main body portion and secured to a cutting bar of said trimming device, wherein said bottom incorporates at least one side portion in juxtaposed relationship to one cooperative side of said clipping catcher tray, and releasably connected thereto by angle-adjusting means;
   C. said angle-adjusting means comprising a bolt-and-wing nut assembly detachably connecting the catcher tray side and the juxtaposed side of the bottom plate through curved slot means, and adjustable to vary the angle of said clipping catcher tray relative to the cutting plane of said trimming device over a plurality of angles comprising a range of adjusted positions.

6. A clipping catcher attachment for a hedge trimming device operable to trim the ends of shrubbery, twigs and branches along a cutting plane, having a stationary cutting bar and a reciprocating shear blade, comprising:
   A. an adjustable clipping catcher tray incorporating a main body portion with cooperating sides;
   B. a bottom hingedly attached to said main body portion and secured to a cutting bar of said trimming device, incorporating at least one side portion in juxtaposed relationship to one cooperative side of said clipping catcher tray, and releasably connected thereto by angle-adjusting means;
   C. said angle-adjusting means comprising a ball-detent assembly having a transversely movable knobbed shaft positionable within a curved slot in said catcher tray side, the knob of said shaft providing a plurality of adjusted positions when engaged in any of a series of socket depressions along said curved slot, thereby adjustably varying the angle of said clipping catcher tray relative to the cutting plane of said trimming device over a plurality of angles comprising a range of adjusted positions.

7. A clipping catcher attachment as defined in claim 6, wherein the ball-detent assembly is constructed from a stiff resilient plastic material; whereby the ball is normally biased inwardly toward the detent, thereby lockedly engaging any of the series of socket depressions.

8. A clipping catcher attachment for a hedge trimming device operable to trim the ends of shrubbery, twigs and branches along a cutting plane, having a stationary cutting bar and a reciprocating shear blade, comprising:
- a clipping catcher tray incorporating a main body portion with cooperating sides connected thereto;
- B. a bottom fixedly attached to said main body portion and having a raised elongated rectangular portion secured to a cutting bar of said trimming device; and
- C. an extensible outrigger bar extending beyond said catcher tray away from said cutting bar and having adjustment legs slidably and grippingly engaged in elongated anchoring sleeve portions of the catcher tray extending generally perpendicular to the cutting bar for support and adjustment of the outrigger bar relative to the catcher tray, whereby the outrigger bar may be extended away from or retracted toward said cutting bar.

* * * * *